(12) United States Patent
Liu et al.

(10) Patent No.: US 11,962,259 B2
(45) Date of Patent: Apr. 16, 2024

(54) METHOD OF CONTROLLING A DRIVE SYSTEM, A CONTROLLER FOR CONTROLLING A DRIVE SYSTEM, A DRIVE SYSTEM AND AN ASSEMBLY COMPRISING A CONTROLLER, A DRIVE SYSTEM AND A PERMANENT MAGNET SYNCHRONOUS MOTOR

(71) Applicant: CITY UNIVERSITY OF HONG KONG, Kowloon (HK)

(72) Inventors: Chunhua Liu, Kowloon (HK); Senyi Liu, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 352 days.

(21) Appl. No.: 17/562,818

(22) Filed: Dec. 27, 2021

(65) Prior Publication Data
US 2023/0208342 A1   Jun. 29, 2023

(51) Int. Cl.
*H02P 29/68* (2016.01)
*H02K 11/33* (2016.01)
*H02P 27/08* (2006.01)

(52) U.S. Cl.
CPC ............. *H02P 29/68* (2016.02); *H02K 11/33* (2016.01); *H02P 27/08* (2013.01)

(58) Field of Classification Search
CPC .......... H02P 21/22; H02P 21/18; H02P 27/08; H02P 21/0003; H02P 21/14; H02P 25/22; H02P 27/06; H02P 2207/05; H02P 21/00; H02P 29/62; H02P 6/14; H02P 6/15; H02P 6/28; H02K 3/28; H02K 11/33; H02K 21/14; B60L 15/025; B60L 2210/40
See application file for complete search history.

(56) References Cited

U.S. PATENT DOCUMENTS

2022/0255482 A1*   8/2022   Jevremovic ............. H02P 25/22

* cited by examiner

*Primary Examiner* — Antony M Paul
(74) *Attorney, Agent, or Firm* — Conley Rose, P.C.; Michael W. Piper; Andrew M. Metrailer

(57) ABSTRACT

A drive system is disclosed which applies to a six-phase integrated permanent magnet synchronous motor. The motor includes a set of six-phase half-bridge drive system and a thermistor monitoring system for monitoring the temperature of the six-phase half-bridge drive system. Aiming at the problem that the six-phase drive system is complicated and has many components, the invention adopts a grouping method to divide the six-phase drive system into two sets of three-phase drive half-bridges. To provide stability for long term operation, a thermistor is used to accurately measure the temperature changes.

13 Claims, 7 Drawing Sheets

| Θref (deg) | Υref(deg) | Vv1 | Vv2 |
|---|---|---|---|
| -15~15 | Θref+15 | [1;0;0.27;0;1;0.27] | [1;0.27;0;0;1;0.73] |
| 15~45 | Θref-15 | [1;0;0.73;0.27;1;0] | [1;0;0.27;0;1;0.27] |
| 45~75 | Θref-45 | [0.73;0;1;0.73;1;0] | [1;0;0.73;0.27;1;0] |
| 75~105 | Θref-75 | [0.27;0;1;1;0.73;0] | [0.73;0;1;0.73;1;0] |
| 105~135 | Θref-105 | [0;0.27;1;1;0.27;0] | [0.27;0;1;1;0.73;0] |
| 135~165 | Θref-135 | [0;0.73;1;1;0;0.27] | [0;0.27;1;1;0.27;0] |
| 165~195 | Θref-165 | [0;1;0.73;1;0;0.73] | [0;0.73;1;1;0;0.27] |
| 195~225 | Θref-195 | [0;1;0.27;0.73;0;1] | [0;1;0.73;1;0;0.73] |
| 225~255 | Θref-225 | [0.27;1;0;0.27;0;1] | [0;1;0.27;0.73;0;1] |
| 255~285 | Θref-255 | [0.73;1;0;0;0.27;1] | [0.27;1;0;0.27;0;1] |
| 285~315 | Θref-285 | [1;0.73;0;0;0.73;1] | [0.73;1;0;0;0.27;1] |
| 315~345 | Θref-315 | [1;0.27;0;0;1;0.73] | [1;0.73;0;0;0.73;1] |

*Figure 4*

METHOD OF CONTROLLING A DRIVE SYSTEM, A CONTROLLER FOR CONTROLLING A DRIVE SYSTEM, A DRIVE SYSTEM AND AN ASSEMBLY COMPRISING A CONTROLLER, A DRIVE SYSTEM AND A PERMANENT MAGNET SYNCHRONOUS MOTOR

BACKGROUND

The present invention relates to a method of controlling a drive system for an N phase permanent magnet synchronous motor. The present invention also relates to a controller for controlling a drive system for an N phase permanent magnet synchronous motor. The present invention also relates to a drive system for an N phase permanent magnet synchronous motor. The present invention also relates to an assembly comprising a controller, a drive system and a permanent magnet synchronous motor.

Drive systems for N phase permanent magnet synchronous motors are well known. Such drive systems typically comprise inverters which comprise a plurality of switches. Methods of controlling the drive system to drive the motor by switching the switches on and off in patterns are known. Such methods however are computationally complex and so difficult and expensive to implement.

The present invention seeks to overcome the problems of the prior art.

STATEMENT OF INVENTION

Accordingly, in a first aspect, the present invention provides A method of controlling a drive system for an N phase permanent magnet synchronous motor, the motor comprising a rotor and a stator, the rotor comprising at least one permanent magnet and the stator comprising N windings, wherein N is an integer greater than 2, each winding comprising first and second ends;
the drive system comprising
first and second power rails;
a DC power supply of voltage Vdc connected between the first and second power rails;
N bridge arms connected in parallel between the first and second power rails, each bridge arm comprising first and second switches connected in series;
N output lines, each output line being connected between a first end of a winding and a bridge arm at a point between the first and second switches; each output line being connected to a different winding and a different half bridge arm;
the method comprising the steps of for each of a plurality of consecutive duty cycles
(a) providing the rate of rotation w of the rotor and a reference rate of rotation wref to a PI controller, the output of the PI controller being the q axis reference current iqref;
(b) providing iqref and a measured q axis current iq to a PI controller, the output of the PI controller being the q axis reference voltage Uqref;
(c) providing a d axis reference current idref and a measured d axis current id to a PI controller, the output of the PI controller being the d axis reference voltage Udref;
(d) determining from a look up table the switch pattern for the next duty cycle, the output of the look up table being dependent upon Uqref and Udref; and;
(e) setting the switches of the drive system at the end of the duty cycle to the determined switch pattern for the next duty cycle.

The method according to the invention employs a simple look up table. This significantly reduces the computational burden and can be simply implemented by an MCU.

Preferably the step of determining the switch pattern for the next duty cycle comprises the steps of
(a) mapping Uqref and Udref onto a new plane αβ according to the relations $$U_{\alpha ref} = \cos(\theta_e) U_{dref} - \sin(\theta_e) U_{qref}$$

$$U_{\beta ref} = \cos(\theta_e) U_{qref} + \sin(\theta_e) U_{dref}$$

where $\theta_e$ is the electrical angle of the rotor
(b) determining the amplitude Aref and angle θref from Uαref and Uβref according to the relations $$A_{ref} = \sqrt[2]{U_{\alpha ref}^2 + U_{\beta ref}^2}$$

$$\theta_{ref} = \operatorname{atan}(U_{\beta ref} / U_{\alpha ref})$$

(c) determining new angle Yref, primary switch pattern vv1 and secondary switch pattern vv2 from a look up table dependent on θref;
(d) determining primary and secondary durations d1 and d2 according to the relation $$\frac{d_1}{\sin \Upsilon_{ref}} = \frac{A_{ref}}{0.597 V_{dc} \sin(2\pi/3)} = \frac{d_2}{\sin(\pi/3 - \Upsilon_{ref})}$$

(e) determining the switch pattern S for the next duty cycle according to the relation $$S = d_1 vv_1 + d_2 vv_2$$

Preferably the d axis reference current is zero
Preferably the method further comprises the step of measuring the temperature of the drive system and, if the temperature exceeds a predetermined value, limiting the value of iqref. This ensures that the temperature of the drive system does not exceed a predetermined limit so increasing the reliability of the drive system. The algorithm for achieving this is simple to implement.

Preferably iqref is limited by at least 50%, more preferably at least 75%.

In a further aspect of the invention there is provided a controller for controlling a drive system for an N phase permanent magnet synchronous motor, the motor comprising a rotor and a stator, the rotor comprising at least one permanent magnet, the stator comprising N windings, where N is an integer greater than 2, each winding comprising first and second ends,
the drive system comprising
first and second power rails;
a DC power supply of voltage Vdc connected between the first and second power rails;
N bridge arms connected in parallel between the first and second power rails, each bridge arm comprising first and second switches connected in series;
N output lines, each output line being connected between a first end of a winding and a bridge arm at a point between the first and second switches, each output line being connected to a different winding and a different bridge arm;

the controller comprising
(a) a first PI controller adapted to receive the rate of rotation w of the rotor and a reference rate of rotation wref and in response output a q axis reference current iqref;
(b) a second PI controller adapted to receive iqref and a measured q axis current iq and in response output a q axis reference voltage Uqref
(c) a third PI controller adapted to receive a measured d axis current id and a d axis reference current idref and in response output a d axis reference voltage Udref;
(d) a signal processor adapted to receive Uqref and Udref and determine a switch pattern for the switches of the drive system from a lookup table, the output of the look up table being dependent on Uqref and Udref, the signal processor further comprising an output for providing the switch pattern to the switches The controller according to the invention employs a look up table. It is therefore simple and inexpensive to implement.

Preferably the signal processor is adapted to determine the switch pattern by performing the steps of
(a) mapping Uqref and Udref onto a new plane $\alpha\beta$ according to the relations $$U_{\alpha ref} = \cos(\theta_e)U_{dref} - \sin(\theta_e)U_{qref}$$

$$U_{\beta ref} = \cos(\theta_e)U_{qref} + \sin(\theta_e)U_{dref}$$

where $\theta_e$ is the electrical angle of the rotor
(b) determining the amplitude Aref and angle θref from U$\alpha$ref and U$\beta$ref according to the relations $$A_{ref} = \sqrt[2]{U_{\alpha ref}^2 + U_{\beta ref}^2}$$

$$\theta_{ref} = \operatorname{atan}(U_{\beta ref}/U_{\alpha ref})$$

(c) determining new angle Yref, primary switch pattern vv1 and secondary switch pattern vv2 from a look up table dependent on θref;
(d) determining primary and secondary durations d1 and d2 according to the relation $$\frac{d_1}{\sin \Upsilon_{ref}} = \frac{A_{ref}}{0.597 V_{dc}\sin(2\pi/3)} = \frac{d_2}{\sin(\pi/3 - \Upsilon_{ref})}$$

(e) determining the switch pattern S for the next duty cycle according to the relation $$S = d_1 vv_1 + d_2 vv_2$$

Preferably the controller further comprises a signal limiter connected to the output of the first PI controller and a temperature measurement device connected to the signal limiter, the signal limiter being configured to activate and limit the value of iqref provided to the second PI controller when the temperature measured by the temperature measurement device exceeds a predetermined value. This ensures that the temperature of the drive system never exceeds a predetermined limit so increasing the reliability of the drive system. Further, the structure of the controller makes such temperature regulation easy to implement, by simply including a signal limiter into the circuit.

Preferably the temperature measurement device is a thermistor.

In a further aspect of the invention there is provided an assembly comprising
a controller as claimed in any one of claims 6 to 9;
an N phase permanent magnet synchronous motor, the motor comprising
a rotor and a stator;
the rotor comprising at least one permanent magnet;
the stator comprising N windings, where N is an integer greater than 2, each winding comprising first and second ends;
a drive system comprising
first and second power rails;
a DC power supply of voltage Vdc connected between the first and second power rails;
N bridge arms connected in parallel between the first and second power rails, each bridge arm comprising first and second switches connected in series;
N output lines, each output line being connected between a first end of a winding and a half bridge arm at a point between the first and second switches, each output line being connected to a different winding and a different bridge arm;
the output of the signal processor being connected to the switches of the drive system.

The assembly according to the invention is simple to implement.

Preferably the N bridge arms are grouped into A groups of B bridge arms such that N=AB, each group of B bridge arms being a B phase inverter. This simplifies the structure of the drive system.

Preferably B=3.

In a further aspect of the invention there is provided a drive system for an N phase permanent magnet synchronous motor, the motor comprising a rotor and a stator, the rotor comprising at least one permanent magnet and the stator comprising N windings,
the drive system comprising
first and second power rails;
a DC power supply of voltage Vdc connected between the first and second power rails;
N bridge arms connected in parallel between the first and second power rails, each bridge arm comprising first and second switches connected in series;
N output lines, each output line comprising a first end connected to a bridge arm at a point between the first and second switches and a second end for connection to a winding;
the N bridge arms being grouped into A groups of B bridge arms such that N=AB, each group of B bridge arms being a B phase inverter.

The grouping results in a drive system which has a simple structure compared to known drive systems. It also means the drive system has low current and large torque.

DRAWINGS

The present invention will now be described by way of example only and not in any limitative sense with reference to the accompanying drawings in which FIG. 1 shows a six phase permanent magnet synchronous motor is schematic end view;

FIG. 4 shows a look up table employed in the method according to the invention;

DESCRIPTION OF EMBODIMENTS

Figure 1:
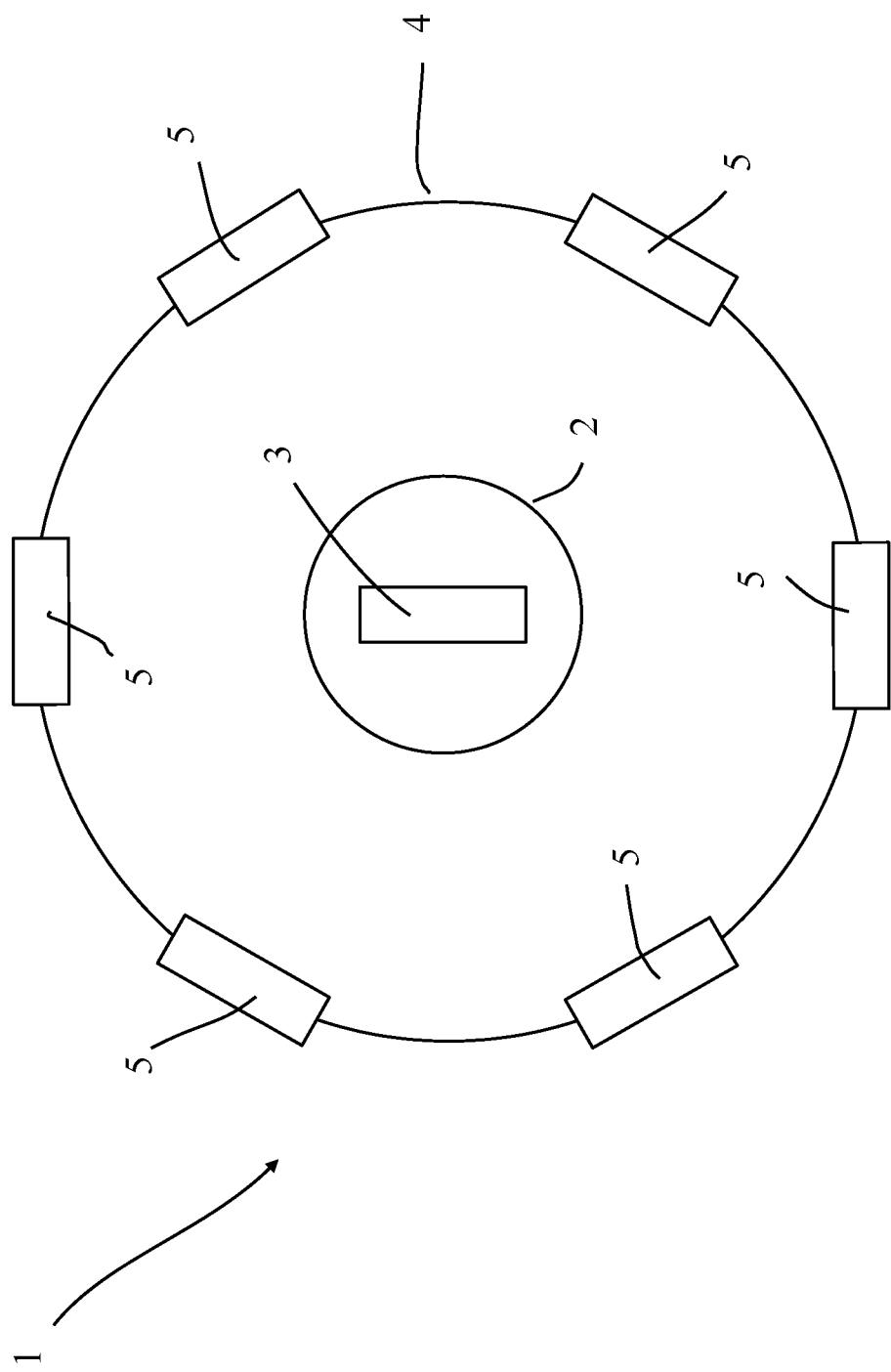

FIG. 1 shows a six phase permanent magnet synchronous motor 1 in schematic end view. The motor 1 comprises a rotor 2 which in turn comprises a permanent magnet 3. Surrounding the motor 1 is a stator 4. The motor 1 is a six phase motor 1 and accordingly the stator 4 comprises six windings 5, each winding having first and second ends. By providing current to the windings 5 in the appropriate phase relationship one can cause the rotor 2 to turn as is known in the art.

Figure 2:
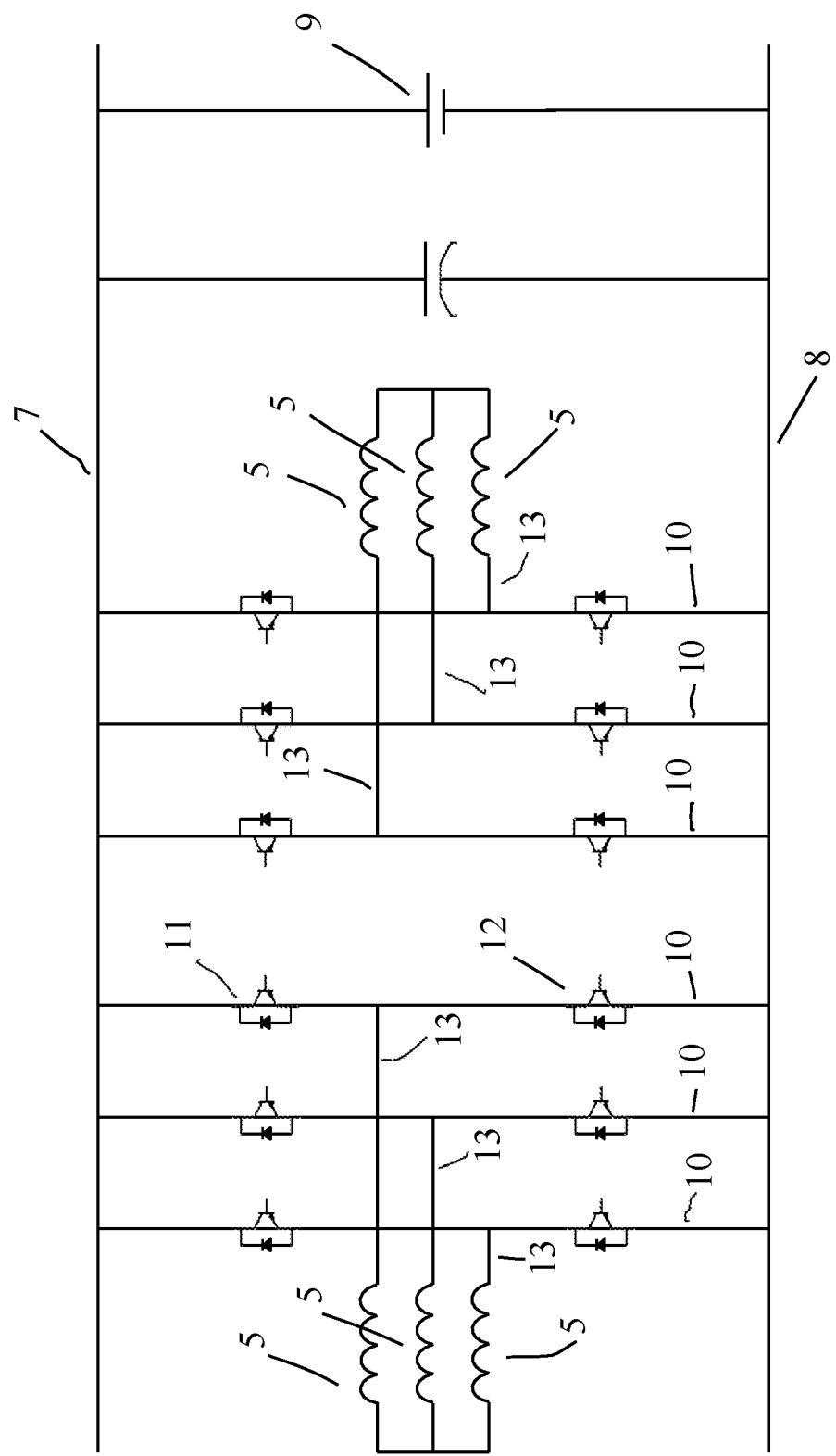
FIG. 2 shows, in schematic form, a drive system according to the invention.

Shown in FIG. 2 in schematic form is a drive system 6 according to the invention for a six phase permanent magnet synchronous motor 1. The drive system 6 comprises first and second power rails 7,8. A power supply 9 of voltage Vdc is connected between the power rails 7,8. Six bridge arms 10 are connected in parallel between the first and second power rails 7,8. Each bridge arm comprises first and second switches 11,12. In this embodiment each switch 11,12 is an IGBT with a diode optionally connected across it as shown. In alternative embodiments each switch 11,12 is a MOSFET.

The base of each transistor 11,12 is connected to a controller (not shown). In use the controller provides voltages to the bases of the transistors 11,12 so switching them between open and closed states as will be described in more detail below.

The drive system 6 further comprises six output lines 13. Each output line 13 is connected at a first end to the bridge arm 10 at a point between the two switches 11,12 and is connected at a second end to a first end of a winding 5 of the motor 1 as shown. In use the controller provides voltages to the bases of the transistors 11,12 so opening and closing the transistors 11,12. This changes the voltages of the output lines 13. By suitable timing of the opening and closing of the transistors 11,12 one can provide suitable currents to the windings 5 to drive the motor 1.

The bridge arms 10 are divided into two groups of three bridge arms 10. For the three bridge arms 10 in one group the associated output lines 13 are connected to the first ends of windings 5. The second ends of the windings 5 are connected together at a common point. The three bridge arms 10 together form a three phase inverter. Grouping the bridge arms 10 into groups in this way simplifies the structure of the drive system 6 and increases its reliability.

The above drive system 6 has six bridge arms 10 which together drive six windings 5. The invention is not so limited. The motor 1 may have N windings 5 and the associated drive system 6 may have corresponding N bridge arms 10. In this case the bridge arms 10 are grouped into A groups of B arms such that N=AB.

Figure 3:
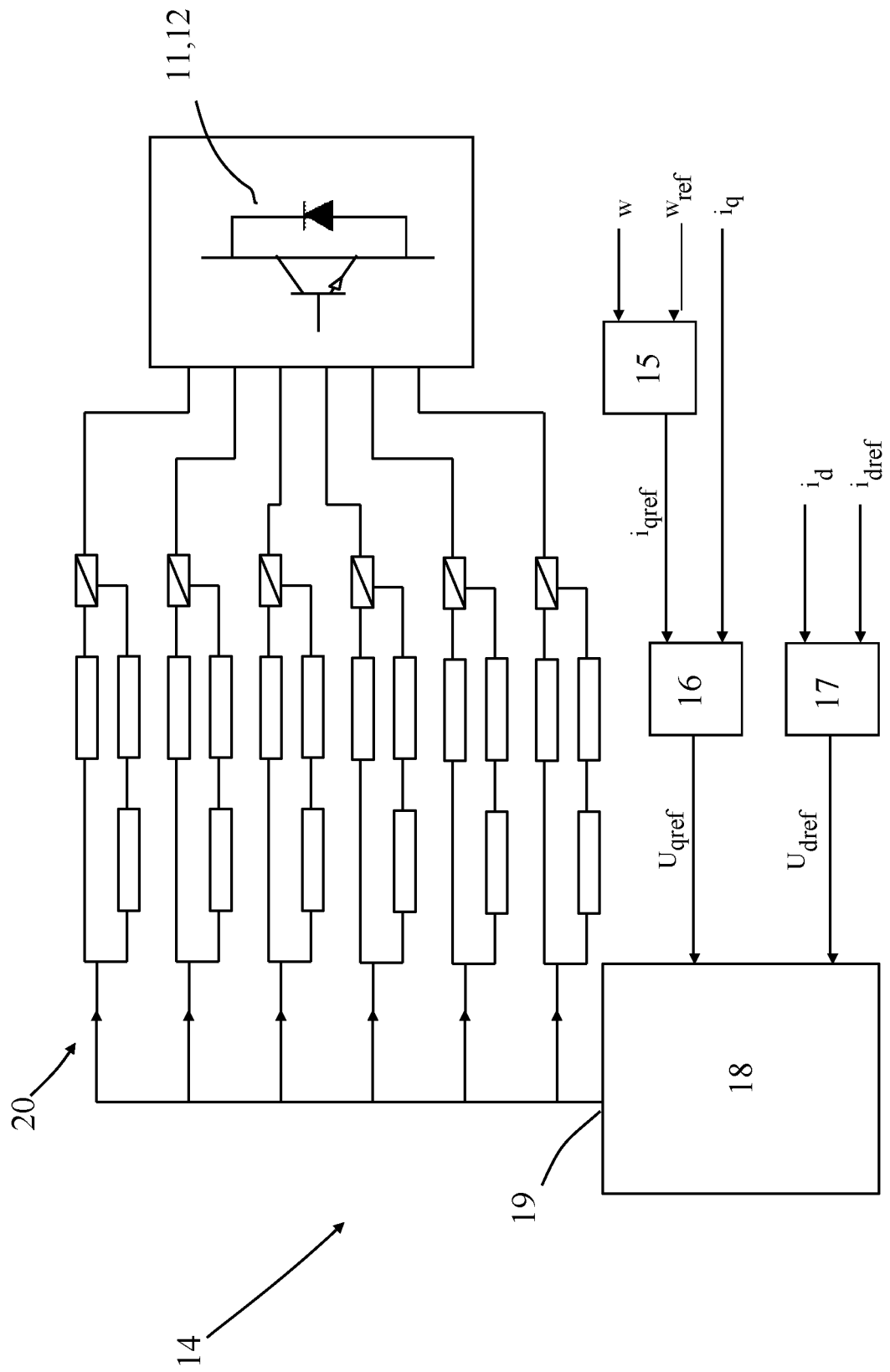
FIG. 3 shows, in schematic form, a controller according to the invention.

Shown in FIG. 3 in schematic form is a controller 14 according to the invention for controlling the drive system 6. In outline, the controller 14 is connected to the switches 11,12 of the drive system 6. The controller 14 operates in a plurality of consecutive duty cycles. In one duty cycle the controller 14 sets the switch pattern of the switches 11,12. During the same duty cycle the controller 14 determines the switch pattern for the next duty cycle. At the end of the original duty cycle the controller 14 sets the switch pattern for the switches 11,12 for the next duty cycle and the process repeats.

The operation of the controller 14 in one duty cycle is now described in more detail. The controller 14 comprises a first PI controller 15. The first PI controller 15 receives the rate of rotation w of the rotor 2 and a reference rate of rotation wref. The output of the first PI controller 15 is a q axis reference current iqref.

The controller 14 further comprises a second PI controller 16. The second PI controller 16 receives iqref and a measured q axis current iq. The output of the second PI controller 16 is a q axis reference voltage Uqref.

The controller 14 further comprises a third PI controller 17. The third PI controller 17 receives a measured d axis current id and a d axis reference current idref which is typically set to zero. The output of the third PI controller 17 is a d axis reference voltage Udref.

The controller 14 further comprises a signal processor 18 which receives Uqref and Udref and performs a series of method steps to determine the new switch pattern. The signal processor 18 comprises an output 19 connected to the switches 11,12 via Boolean logic gates 20 for providing the new switch pattern to the switches 11,12 at the end of the current duty cycle.

Turning now to the method steps performed by the signal processor 18, in a first step Uqref and Udref are mapped onto a new plane αβ according to the relations $U_{\alpha ref}=\cos(\theta_e)U_{dref}-\sin(\theta_e)U_{qref}$ $U_{\beta ref}=\cos(\theta_e)U_{qref}+\sin(\theta_e)U_{dref}$ where $\theta_e$ is the electrical angle of the rotor Next, amplitude Aref and angle θref are determined from Uαref and Uβref according to the relations $$A_{ref} = \sqrt[2]{U_{\alpha ref}^2 + U_{\beta ref}^2}$$

$$\theta_{ref} = \text{atan}(U_{\beta ref} / U_{\alpha ref})$$

In a next step new angle Yref, primary switch pattern vv1 and secondary switch pattern vv2 are determined from a look up table dependent on θref as described in more detail below.

In the next step primary and secondary durations d1 and d2 are determined according to the relation $$\frac{d_1}{\sin Y_{ref}} = \frac{A_{ref}}{0.597 V_{dc}\sin(2\pi/3)} = \frac{d_2}{\sin(\pi/3 - Y_{ref})}$$

In a final step the switch pattern S for the next duty cycle is determined according to the relation $S=d_1vv_1+d_2vv_2$ This switch pattern is then provided to the switches 11,12 at the end of the current duty cycle.

Shown in FIG. 4 is a look up table employed in the method. As can be seen from the table, once one has determined θref one can determine Yref and the associated primary and secondary switch patterns vv1 and vv2. Then, once one has determined d1 and d2 the full switch pattern for the next duty cycle can be determined.

Figure 5:
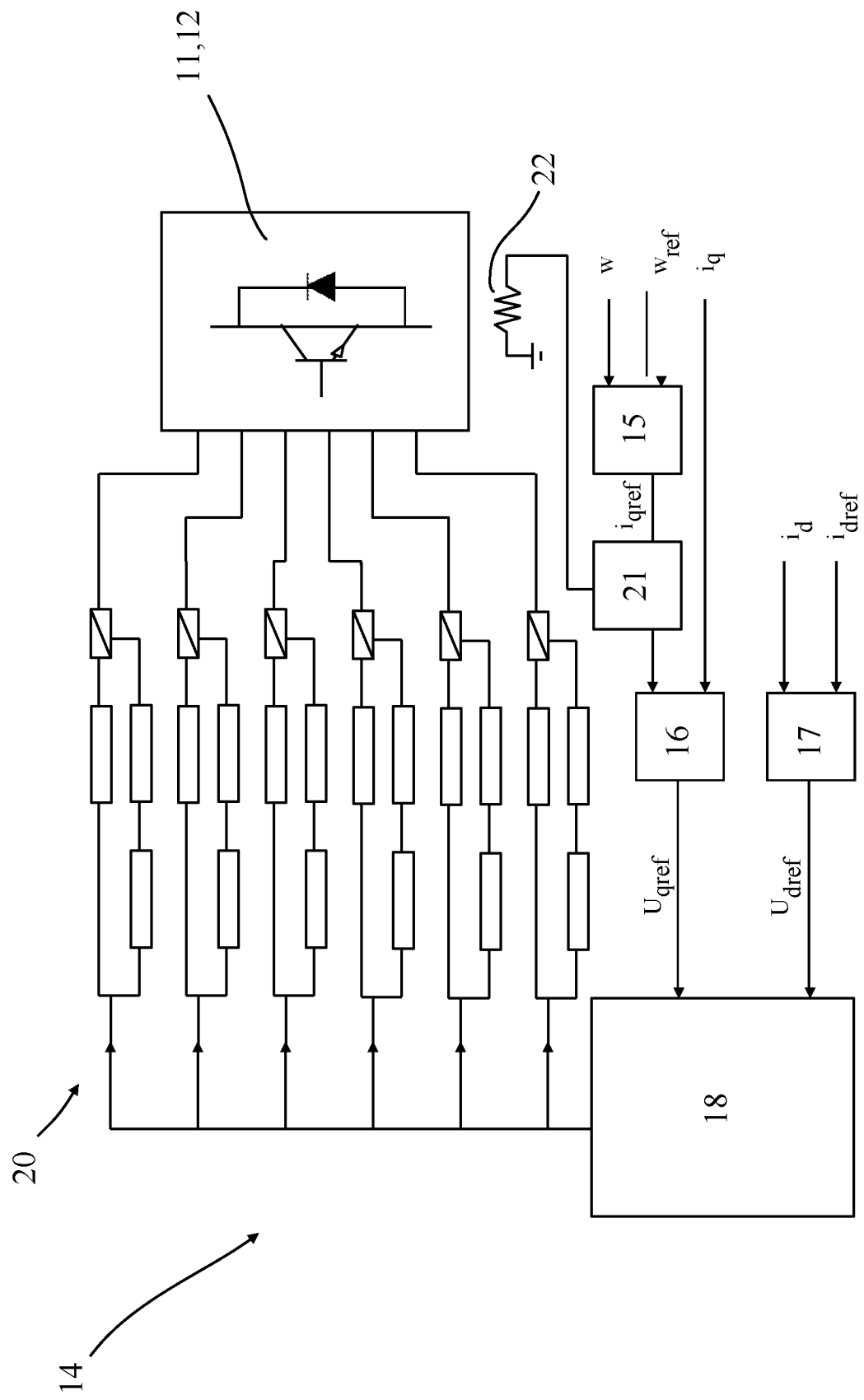
FIG. 5 shows a further embodiment of a controller according to the invention.

Shown in FIG. 5 is a further embodiment of a controller 14 according to the invention. This is similar to that of FIG.

3 except it further comprises a signal limiter 21 between the first and second PI controllers 15,16. Connected to the signal limiter 21 is a temperature measurement device 22, which in this embodiment is a thermistor 22. The thermistor 22 may be connected directly to the signal limiter 21 as shown or may be connected indirectly, for example via the signal processor 18. In use the thermistor 22 measures the temperature of the drive system 6. If the measured temperature exceeds a predetermined value then the thermistor 22 activates the signal limiter 21 which limits the value of iqref passed to the second PI controller 16. This changes the switching pattern which in turn reduces the power passed by the drive system 6 to the windings 5 so cooling the drive system 6. Once the drive system cools to a temperature below the predetermined value the signal limiter 21 deactivates.

Figure 6:
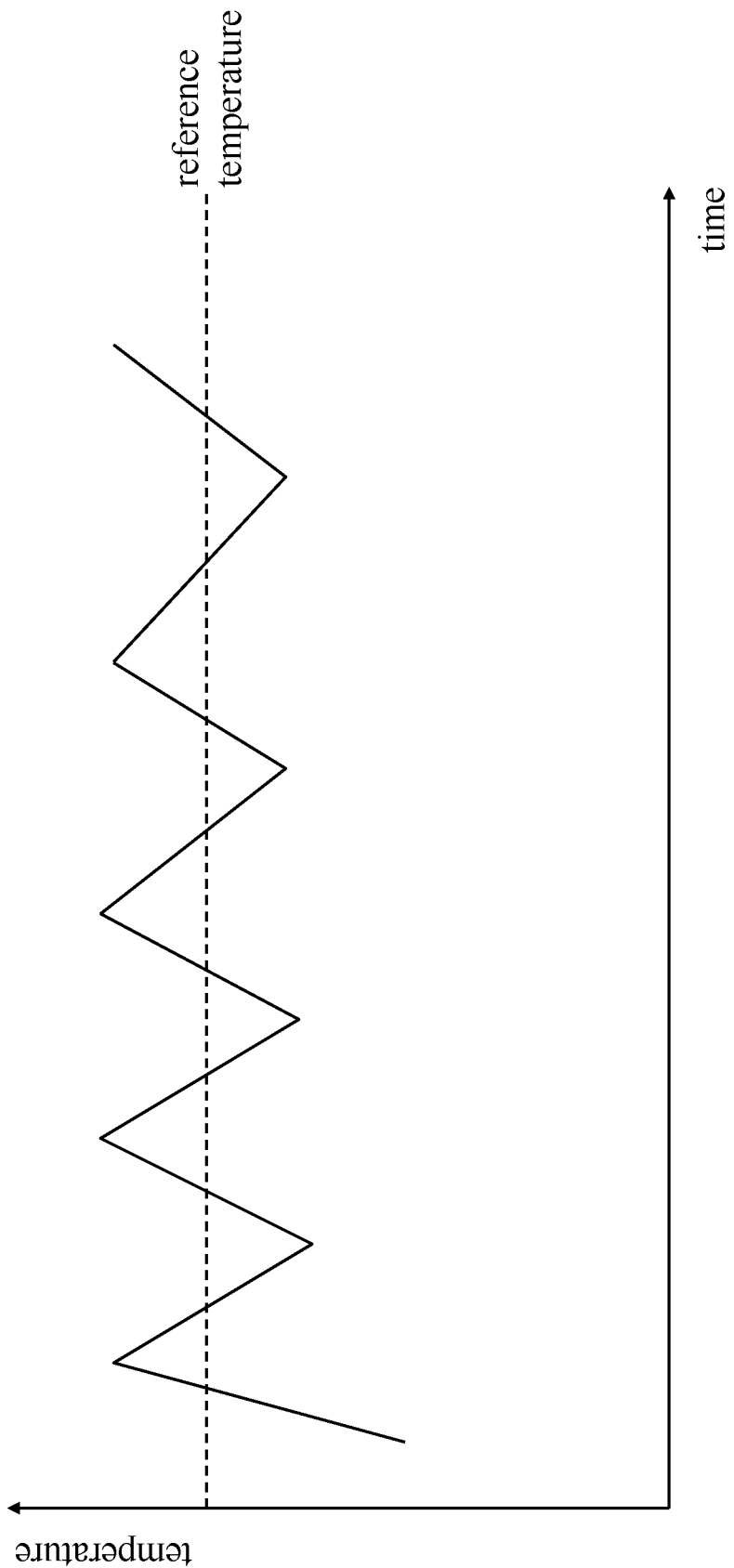
FIG. 6 shows drive system temperature as a function of time.

FIG. 6 shows the temperature of the thermistor 22 as a function of time showing the effect of activation and deactivation of the signal limiter 21.

Figure 7:
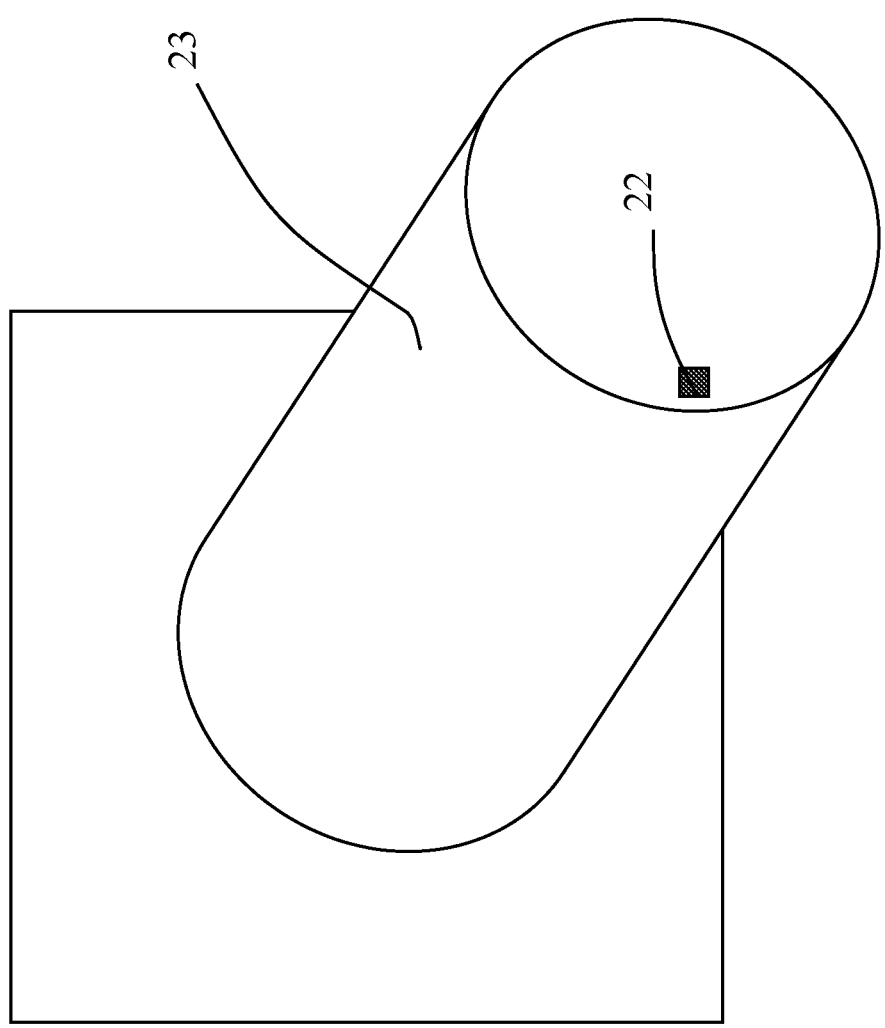
FIG. 7 shows the switches and thermistor in situ.

FIG. 7 shows the thermistor 22 in position. The thermistor is arranged close to the switches 11,12 within a casing 23 which protects the thermistor 22 and switches 11,12 from damage.

The invention claimed is:

1. A method of controlling a drive system for an N phase permanent magnet synchronous motor, the motor comprising a rotor and a stator, the rotor comprising at least one permanent magnet and the stator comprising N windings, wherein N is an integer greater than 2, each winding comprising first and second ends;

the drive system comprising:
first and second power rails;
a DC power supply of voltage Vdc connected between the first and second power rails;
N bridge arms connected in parallel between the first and second power rails, each bridge arm comprising first and second switches connected in series;
N output lines, each output line being connected between a first end of a winding and a bridge arm at a point between the first and second switches; each output line being connected to a different winding and a different half bridge arm;

the method comprising the steps of for each of a plurality of consecutive duty cycles
(a) providing the rate of rotation w of the rotor and a reference rate of rotation wref to a PI controller, the output of the PI controller being the q axis reference current iqref;
(b) providing iqref and a measured q axis current iq to a PI controller, the output of the PI controller being the q axis reference voltage Uqref;
(c) providing a d axis reference current idref and a measured d axis current id to a PI controller, the output of the PI controller being the d axis reference voltage Udref;
(d) determining from a look up table the switch pattern for the next duty cycle, the output of the look up table being dependent upon Uqref and Udref; and;
(e) setting the switches of the drive system at the end of the duty cycle to the determined switch pattern for the next duty cycle.

2. A method as claimed in claim 1, wherein the step of determining the switch pattern for the next duty cycle comprises the steps of
(a) mapping Uqref and Udref onto a new plane αβ according to the relations $U_{\alpha ref} = \cos(\theta_e)U_{dref} - \sin(\theta_e)U_{qref}$ $U_{\beta ref} = \cos(\theta_e)U_{qref} + \sin(\theta_e)U_{dref}$ where $\theta_e$ is the electrical angle of the rotor
(b) determining the amplitude Aref and angle θref from Uαref and Uβref according to the relations $A_{ref} = \sqrt[2]{U_{\alpha ref}^2 + U_{\beta ref}^2}$ $\theta_{ref} = \mathrm{atan}(U_{\beta ref}/U_{\alpha ref})$ (c) determining new angle Yref, primary switch pattern vv1 and secondary switch pattern vv2 from a look up table dependent on θref;
(d) determining primary and secondary durations d1 and d2 according to the relation $$\frac{d_1}{\sin Y_{ref}} = \frac{A_{ref}}{0.597V_{dc}\sin(2\pi/3)} = \frac{d_2}{\sin(\pi/3 - Y_{ref})}$$

(e) determining the switch pattern S for the next duty cycle according to the relation $S = d_1 vv_1 + d_2 vv_2$.

3. A method as claimed in claim 1, wherein the d axis reference current is zero.

4. A method as claimed in claim 1, further comprising the step of measuring the temperature of the drive system and, if the temperature exceeds a predetermined value, limiting the value of iqref.

5. A method as claimed in claim 4, wherein iqref is limited by at least 50%, more preferably at least 75%.

6. A controller for controlling a drive system for an N phase permanent magnet synchronous motor, the motor comprising a rotor and a stator, the rotor comprising at least one permanent magnet, the stator comprising N windings, where N is an integer greater than 2, each winding comprising first and second ends, the drive system comprising:
first and second power rails;
a DC power supply of voltage Vdc connected between the first and second power rails;
N bridge arms connected in parallel between the first and second power rails, each bridge arm comprising first and second switches connected in series;
N output lines, each output line being connected between a first end of a winding and a bridge arm at a point between the first and second switches, each output line being connected to a different winding and a different bridge arm;

the controller comprising:
(a) a first PI controller adapted to receive the rate of rotation w of the rotor and a reference rate of rotation wref and in response output a q axis reference current iqref;
(b) a second PI controller adapted to receive iqref and a measured q axis current iq and in response output a q axis reference voltage Uqref (c) a third PI controller adapted to receive a measured d axis current id and and a d axis reference current idref and in response output a d axis reference voltage Udref;

(d) a signal processor adapted to receive Uqref and Udref and determine a switch pattern for the switches of the drive system from a lookup table, the output of the look up table being dependent on Uqref and Udref, the signal processor further comprising an output for providing the switch pattern to the switches.

7. A controller as claimed in claim 6, wherein the signal processor is adapted to determine the switch pattern by performing the steps of:

(a) mapping Uqref and Udref onto a new plane αβ according to the relations $$U_{\alpha ref}=\cos(\theta_e)U_{dref}-\sin(\theta_e)U_{qref}$$

$$U_{\beta ref}=\cos(\theta_e)U_{qref}+\sin(\theta_e)U_{dref}$$

where $\theta_e$ is the electrical angle of the rotor (b) determining the amplitude Aref and angle θref from Uαref and Uβref according to the relations $$A_{ref} = \sqrt[2]{U_{\alpha ref}^2 + U_{\beta ref}^2}$$

$$\theta_{ref} = \operatorname{atan}(U_{\beta ref}/U_{\alpha ref})$$

(c) determining new angle Υref, primary switch pattern vv1 and secondary switch pattern vv2 from a look up table dependent on θref;

(d) determining primary and secondary durations d1 and d2 according to the relation $$\frac{d_1}{\sin \Upsilon_{ref}} = \frac{A_{ref}}{0.597 V_{dc}\sin(2\pi/3)} = \frac{d_2}{\sin(\pi/3 - \Upsilon_{ref})}$$

(e) determining the switch pattern S for the next duty cycle according to the relation $$S=d_1 vv_1 + d_2 vv_2.$$

8. A controller as claimed in claim 6, further comprising a signal limiter connected to the output of the first PI controller and a temperature measurement device connected to the signal limiter, the signal limiter being configured to activate and limit the value of iqref provided to the second PI controller when the temperature measured by the temperature measurement device exceeds a predetermined value.

9. A controller as claimed in claim 8, wherein the temperature measurement device is a thermistor.

10. An assembly comprising:
a controller as claimed in claim 6;
an N phase permanent magnet synchronous motor, the motor comprising
a rotor and a stator;
the rotor comprising at least one permanent magnet;
the stator comprising N windings, where N is an integer greater than 2, each winding comprising first and second ends;
a drive system comprising
first and second power rails;
a DC power supply of voltage Vdc connected between the first and second power rails;
N bridge arms connected in parallel between the first and second power rails, each bridge arm comprising first and second switches connected in series;
N output lines, each output line being connected between a first end of a winding and a half bridge arm at a point between the first and second switches, each output line being connected to a different winding and a different bridge arm;
the output of the signal processor being connected to the switches of the drive system.

11. An assembly as claimed in claim 10, wherein the N bridge arms are grouped into A groups of B bridge arms such that N=AB, each group of B bridge arms being a B phase inverter.

12. An assembly as claimed in claim 11, wherein B=3.

13. A drive system for an N phase permanent magnet synchronous motor, the motor comprising a rotor and a stator, the rotor comprising at least one permanent magnet and the stator comprising N windings,
the drive system comprising
first and second power rails;
a DC power supply of voltage Vdc connected between the first and second power rails;
N bridge arms connected in parallel between the first and second power rails, each bridge arm comprising first and second switches connected in series;
N output lines, each output line comprising a first end connected to a bridge arm at a point between the first and second switches and a second end for connection to a winding;
the N bridge arms being grouped into A groups of B bridge arms such that N=AB, each group of B bridge arms being a B phase inverter.

* * * * *